W. H. KENERSON.
TORSION MEASURING APPARATUS.
APPLICATION FILED DEC. 19, 1908.

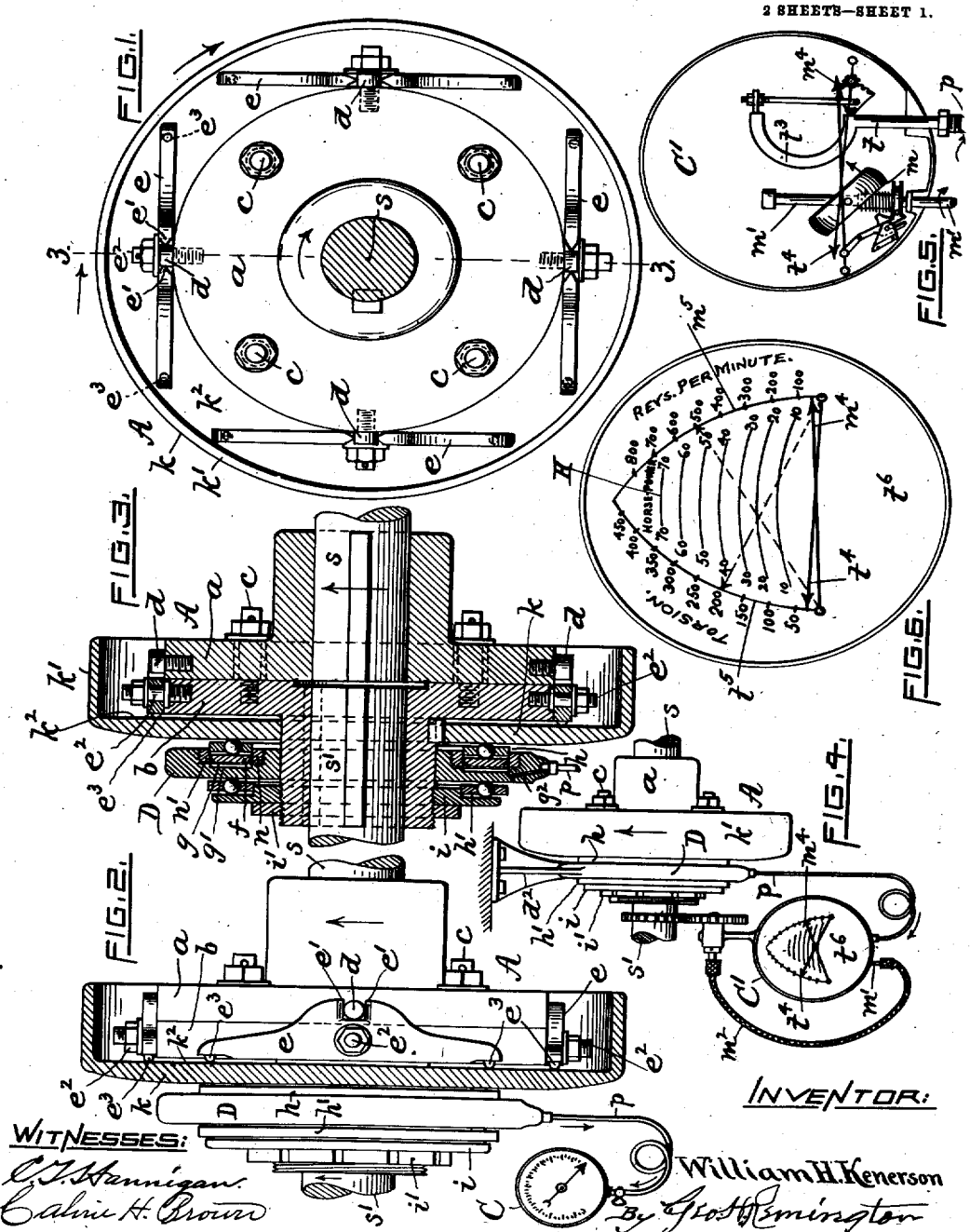

924,242.

Patented June 8, 1909.
2 SHEETS—SHEET 2.

WITNESSES:

INVENTOR:
William H. Kenerson.
By Geo. H. Remington.
Atty.

UNITED STATES PATENT OFFICE.

WILLIAM H. KENERSON, OF PROVIDENCE, RHODE ISLAND.

TORSION-MEASURING APPARATUS.

No. 924,242.  Specification of Letters Patent.  Patented June 8, 1909.

Application filed December 19, 1908. Serial No. 468,411.

*To all whom it may concern:*

Be it known that I, WILLIAM H. KENERSON, a citizen of the United States of America, and a resident of Providence, in the county of Providence and State of Rhode Island, have invented certain new and useful Improvements in Torsion-Measuring Apparatus, of which the following is a specification.

My present invention relates to improved torsion-measuring apparatus and means for indicating and recording the torsional force or pressure transmitted by and through the apparatus, and it consists in the novel construction and arrangement of the elements or members thereof, all as hereinafter fully set forth and claimed.

The objects sought to be attained by this invention are to produce an apparatus of the character referred to possessing a greater degree of efficiency, and at the same time being smaller, more accurate and materially less expensive to manufacture than devices of this general type heretofore produced. It may be added that the device is practically frictionless and capable of indicating very slight changes of variations in the torque or moments being measured by the apparatus.

The torsion-measuring means forming the subject of this application for patent is more particularly adapted to be secured or connected to a revoluble power-transmitting shaft so as to automatically indicate or record its torque or pressure; it may, however, be readily employed for indicating static force.

Figure 7:
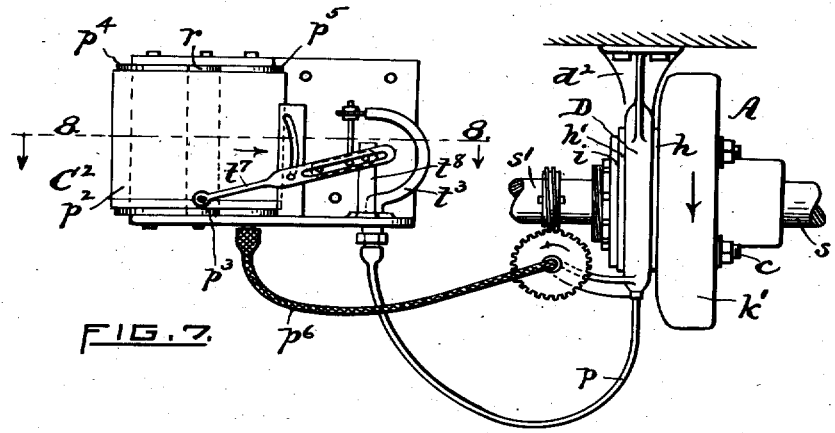
Figure 8:
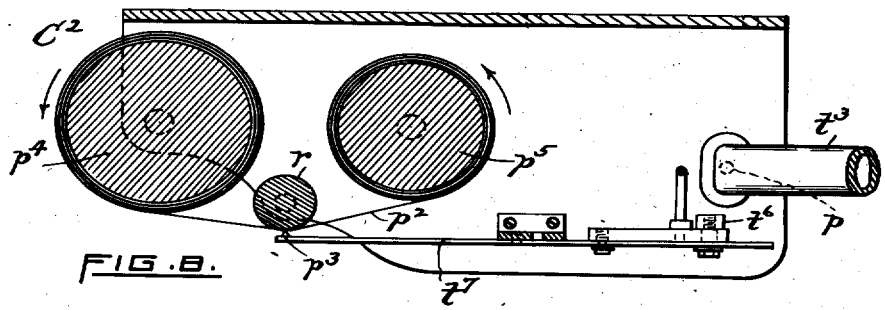
Figure 9:
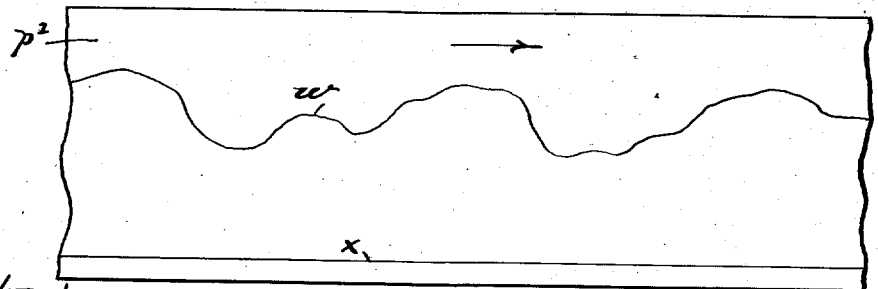

In the accompanying two sheets of drawings, Figure 1 represents a front end view of my improved torsion-measuring apparatus. Fig. 2 is a corresponding side elevation, in partial section, showing the device connected to a torsion-indicating gage. Fig. 3 is a longitudinal central sectional view taken substantially on line 3 3 of Fig. 1. Fig. 4 is a side elevation, in reduced scale, showing the apparatus connected to a combined pressure-gage and speedometer having movable pointers operatively connected therewith, and a dial provided with graduated torsion, speed and horse-power scales arranged with relation to the pointers. Fig. 5 is a front view, in enlarged scale, showing the general construction and arrangement of the pressure and speed gages, the dial being removed. Fig. 6 is a further enlarged front view of the graduated dial itself, and also showing the normal or zero position of the pointers. Fig. 7 represents a side elevation of the apparatus connected to a pressure-recording gage. Fig. 8 is an enlarged horizontal sectional view, taken substantially on line 8 8 of Fig. 7, and Fig. 9 shows a continuous variable pressure line or diagram capable of being produced by the recording-gage.

The following is a more detailed description of my improved torsion-measuring apparatus, indicated on the drawings by A:

The main connecting or flanged coupling members, $a$ and $b$, as represented, are keyed to the adjacent ends of the respective revoluble independent shafts $s$ $s^1$. In order to positively maintain the coupling members in normal relation to each other longitudinally and thus prevent endwise separation I prefer to employ bolts $c$ passing freely through the member $a$ and tapped into the fellow member $b$, as clearly shown. The member $a$, which is represented as being the primary or main driving element, has a plurality of evenly spaced radially disposed steel pins $d$ secured to its periphery or rim. The outer or head portion of each pin extends a short distance beyond the rim and is in continuous contact with the adjacent edges of a pair of short V-shaped extensions $e^1$, forming one arm of the three-arm lever $e$ pivoted or fulcrumed on a steel pin or bolt $e^2$, the latter being tapped radially into the rim of the corresponding coupling member $b$ and located immediately in the rear of pin $d$. These pins are disposed parallel with each other, at right angles to and in line with the longitudinal axis of the shafts. The lever $e$ as shown extends tangentially of the rim and is provided at each end with a small well-rounded contact-pin $e^3$ projecting from its rear edge. See Fig. 2. These pins are employed to coöperate with intervening means for equalizing the pressure upon the area of the confined annular diaphragm $g$, soon to be described.

On the hub of the driven or secondary member $b$ and concentric therewith is loosely mounted a suitably supported annular sattionary diaphragm-holder D, the same having a shallow annular recess or chamber $g^1$ for containing an inert fluid, as oil. The oil chamber is by means of a small passage or duct $g^2$ and connecting tube $p$ in continuous open communication with an ordinary pressure or torsion-indicating gage, as C, Fig. 2. The chamber $g^1$ of the apparatus may be connected to a gage $C^1$, Fig. 4, wherein is shown an ordinary hydraulic gage $t$ and a well-known type of speedometer $m$, each being provided with a pointer. By simply connecting the apparatus A to a suitable recording gage $C^2$, substantially as shown in Fig. 7, the pressure or torque exerted while in action is automatically traced by a pressure-controlled pencil or marker $p^3$ upon a moving strip of paper $p^2$ mounted on revoluble cylinders $p^4$ $p^5$, the latter say being driven by shaft $s^1$ through the medium of suitable gearing, as for example a worm and gear and flexible shaft $p^6$, at any desired speed ratio. The front side or face of said diaphragm-holder D has an enlarged recess therein arranged concentrically to the chamber $g^1$ adapted to form a seat for the annular metal diaphragm $g$. Inner and outer annular nuts, $n$, $n^1$, screwed to the respective walls or sides of the recess serve to removably secure the diaphragm in position, the latter in fact constituting the front wall of the oil-chamber $g^1$. A laterally movable annular follower or piston $f$ is fitted and supported between the adjacent walls of said nuts and bears directly and uniformly upon that portion of the diaphragm unsupported by the nuts, all as clearly shown in Fig. 3.

Contiguous to the front and rear faces of the relatively stationary holder D and concentric therewith are located suitably supported annular frames or cages, $h$ $h^1$, each carrying a series of antifriction balls exceeding in diameter the thickness of the respective cages. The rear cage, $h^1$, is interposed between the holder D and a thrust-collar or nut $i$, screwed or otherwise adjustably secured to the hub of the coupling member $b$, the balls themselves of the cage being in continuous frictional contact with and adapted to move in circular paths of the respective members D and $i$. A check-nut $i^1$ is employed for obvious purposes.

I would state that if desired the member D may be provided with a foot or bracket $d^2$ thereby adapting the member to be secured to or suspended from a fixed base. See Figs. 4 and 7.

A disk-shaped member $k$, preferably provided with an overhanging protecting rim $k^1$, is keyed to the hub of the coupling $b$ and is capable of a short longitudinal movement thereon. As thus devised provision is made so as to compensate for the wear of said balls and the adjacent surfaces of the members with which they are in contact. The member $k$ is located between the back of the coupling's flange and the front ball-carrying cage $h$.

When in action one or the other of the elements $e^3$ of each of the levers $e$ (according to the direction of rotation of the driving coupling $a$) is in continuous frictional contact with the adjacent front face $k^2$ of the disk $k$, thereby at the same time causing all the balls of the front cage to press uniformly against the face of the piston $f$ (mounted in the stationary member D), corresponding with the torsional pressure or force exerted in overcoming the work or resistance upon the shaft $s^1$. The displacement of the fluid by the thus acted upon diaphragm is very minute, since the working area is or may be several hundred fold greater than the cross-sectional area of the bent gage-tube $t^3$ connected therewith. See Fig. 5. The corresponding movements of the tube, due to its expansion and contraction, are by suitable movement-multiplying means transmitted to and actuate a pointer or hand $t^4$ arranged with relation to a suitably graduated scale $t^5$ of a dial $t^6$, as indicated in Figs. 4, 5 and 6. I make no claim herewith to a pressure-indicating gage. The speedometer $m$, associated with said gage-tube $t^3$, Fig. 5, is a well-known device employed for automatically indicating the speed of rotation of the shaft to which it may be connected. The device as represented is suitably incased and is provided with a vertical revoluble spindle $m^1$ secured to a flexible shaft $m^2$, in turn connected to a short shaft driven by gearing actuated by the shaft $s^1$. See Fig. 4. The speedometer mechanism is provided with movement-multiplying means for actuating a pivoted pointer $m^4$ arranged with relation to a suitably graduated scale $m^5$ of the dial $t^6$. It may be stated in this connection that a scale H may be computed and then arranged on the dial with relation to the said torsion and speed scales, as shown in Fig. 6, so as to indicate horse-power; the latter designating the power transmitted by and through the apparatus A, corresponding with variations in the speed and torsional force and the ratio of leverage, &c., acting upon the fluid in the chamber $g^1$. As thus devised the position of the two pointers where they cross each other on the scale H designates the corresponding horse-power:—As for example, the pointers (shown in dotted line position in Fig. 6) indicate that the apparatus is transmitting about 20 H. P., when running at 500 revolutions per minute, the torsional pressure being 200 foot pounds.

In Figs. 7 and 8, which represent my improved torsion-measuring apparatus A combined with pressure-recording means, $C^2$, the latter is provided with a frame or housing having a pair of laterally separated vertically mounted revoluble cylinders, $p^4$, $p^5$, arranged to carry a continuous strip $p^2$ of suitably ruled paper. The latter is adapted to be reeled slowly from cylinder $p^4$ onto the felly or driving cylinder $p^5$, continuous and positive rotation being imparted to it by a flexible shaft $p^6$ actuated by worm and gear mechanism, the worm itself being secured to the power-shaft $s^1$. Thus it is obvious that the cylinder $p^6$ will be revolved in unison with the power-shaft but at a reduced rate of speed, corresponding with the number of teeth in the worm-gear. In this case too a bent gage-tube $t^3$, disposed with relation to the said cylinders, is connected by means of a tube $p$ to the fluid-holding diaphragm-chamber $g^1$ of the stationary element D, but in lieu of the hand $t^4$ a guided movable arm $t^7$ may be employed, the latter being attached to suitable motion-multiplying means operatively controlled by the movements of said tube and being supported by a stationary standard $t^8$. The free end of said arm carries a pencil or tracer $p^3$ adapted to bear lightly upon the adjacent surface of the traveling paper. The paper may have a continuous straight-ruled line $x$ along its lower edge, indicating zero or line of no pressure. The paper passes across the face of a vertical idler or guide-roll $r$ located between but in front of the said cylinders and adjacent the tracer for obvious purposes. By means of this combination the tracer when in use automatically produces a permanent continuous line or diagram $w$ on the surface of the moving paper $p^2$, the line thus formed constitutes a record of the variations (if any) in the torsional pressure or torque.

It may be added that in order to prevent undue wear and friction of the parts certain of the continuously contacting members may be made of hardened steel or other suitable material. The parts thus referred to are the knife-edges or V-points $e^1$, and heads of bolts $d$; the elements $e^3$ and adjacent surface of disk $k$; the antifriction balls carried by the frame $h$, which bear against the said disk and follower $f$; and the balls of the rear frame bearing against the rear side of the stationary element D and the thrust-collar $i$.

My improved torsion-measuring apparatus is adapted to be actuated in either direction without any change whatever in its construction or adjustment; it may be successfully and accurately rotated at a high rate of speed, since all the parts are practically balanced and the friction reduced to a minimum. Moreover, it is simple in construction, small in size and comparatively light in weight, when considered with respect to its capacity for transmitting high powers.

While as just stated the device is capable of being actuated in either direction as desired, it is also obvious that the member $b$ may be the driving element and the felly member $a$ the driven element with equal accuracy and efficiency, and without departing from the spirit of my invention.

What I claim as my invention and desire to secure by United States Letters Patent, is:—

1. A torsion-measuring apparatus comprising a primary or driving element, a relatively stationary element provided with an annular chamber for containing a fluid, an annulus-shaped diaphragm adapted when in use to be resisted by the fluid in said chamber, means operatively connected with the driving element for transmitting to the diaphragm the torsional force exerted, and means connected with the fluid-holding chamber for designating said force.

2. A torsion-measuring apparatus comprising a primary or driving element, a relatively stationary element provided with an annular chamber for containing a fluid, a relatively stationary annular diaphragm forming a wall of and adapted to press against the fluid in said chamber, the latter being arranged to connect with means for showing the pressure, and means operatively connected with said driving element for transmitting to the diaphragm the torsional force exerted by the driving element.

3. A torsion-measuring apparatus comprising a revoluble primary or driving element, a companion or secondary element, means connecting said elements whereby the secondary member is adapted to be driven by and concurrently with the first-named member, a mounted relatively stationary member provided with a fluid-holding chamber, a diaphragm mounted in said chambered member so as to press continuously against the fluid, means operatively connected with the driven element for transmitting to the diaphragm the torsional force or pressure exerted by the said primary element, and means connected with the fluid-holding chamber for indicating or designating the said pressure.

4. In a torsion-measuring apparatus, the combination with a pair of revoluble power-transmitting members, and a plurality of peripherally arranged lever elements connecting said members so as to cause them to move concurrently, of a supported stationary member provided with a fluid-holding chamber and a diaphragm arranged with relation thereto, means connecting said lever elements and diaphragm for imparting the fluid pressures corresponding with the torsional force developed in rotating the power-transmitting members, and means connected with said chamber for showing the pressure.

5. In a torsion-measuring apparatus provided with connected power-transmitting elements, and a mounted non-revoluble fluid-opposed diaphragm arranged with relation to said elements, the combination therewith of means operatively connecting said elements and diaphragm for pressing the latter against the fluid corresponding with the torsional force developed in transmitting power, and means connected with the apparatus for automatically recording said power or pressure.

6. In a torsion-measuring apparatus of the character described, the combination with a suitably mounted fluid-resisted diaphragm, and pressure-conducting means engaging therewith, of a pair of driving and driven power-transmitting members adapted to be secured to the adjacent ends of independent shafts, a plurality of peripherally disposed lever elements pivoted to one of said members and continuously engaging the other member whereby both the members are adapted to move concurrently in a rotative direction, and having each lever element provided with a circumferentially extending arm in continuous contact with said pressure-conducting means.

7. In a torsion-measuring apparatus of the character described, the combination with a suitably mounted fluid-resisted diaphragm, and pressure-conducting means engaging therewith, of a pair of driving and driven power-transmitting members adapted to be secured to the adjacent ends of independent shafts, means for preventing endwise separation of said shafts, a plurality of peripherally disposed lever elements pivoted to one of said members and continuously engaging the other member whereby both the members are adapted to move concurrently in a rotative direction, and having each lever element provided with a circumferentially extending arm in continuous contact with said pressure-conducting means.

Signed at Providence, R. I., this 17th day of December 1908.

WILLIAM H. KENERSON.

Witnesses:
GEO. H. REMINGTON,
HENRY P. STONE.

---

Corrections in Letters Patent No. 924,242.

It is hereby certified that in Letters Patent No. 924,242, granted June 8, 1909, upon the application of William H. Kenerson, of Providence, Rhode Island, for an improvement in "Torsion-Measuring Apparatus," errors appear in the printed specification requiring correction, as follows: In line 26, page 1, the word "of" should read *or;* line 126, page 2, and line 56, page 3, the word "felly" should read *fellow;* and in line 112, page 3, after the word "imparting" the word *to* should be inserted; and that the said Letters Patent should be read with these corrections therein that the same may conform to the record of the case in the Patent Office.

Signed and sealed this 13th day of July, A. D., 1909.

[SEAL.]

C. C. BILLINGS,
*Acting Commissioner of Patents.* and pressure-conducting means engaging therewith, of a pair of driving and driven power-transmitting members adapted to be secured to the adjacent ends of independent shafts, a plurality of peripherally disposed lever elements pivoted to one of said members and continuously engaging the other member whereby both the members are adapted to move concurrently in a rotative direction, and having each lever element provided with a circumferentially extending arm in continuous contact with said pressure-conducting means.

7. In a torsion-measuring apparatus of the character described, the combination with a suitably mounted fluid-resisted diaphragm, and pressure-conducting means engaging therewith, of a pair of driving and driven power-transmitting members adapted to be secured to the adjacent ends of independent shafts, means for preventing endwise separation of said shafts, a plurality of peripherally disposed lever elements pivoted to one of said members and continuously engaging the other member whereby both the members are adapted to move concurrently in a rotative direction, and having each lever element provided with a circumferentially extending arm in continuous contact with said pressure-conducting means.

Signed at Providence, R. I., this 17th day of December 1908.

WILLIAM H. KENERSON.

Witnesses:
GEO. H. REMINGTON,
HENRY P. STONE.

---

Corrections in Letters Patent No. 924,242.

It is hereby certified that in Letters Patent No. 924,242, granted June 8, 1909, upon the application of William H. Kenerson, of Providence, Rhode Island, for an improvement in "Torsion-Measuring Apparatus," errors appear in the printed specification requiring correction, as follows: In line 26, page 1, the word "of" should read *or;* line 126, page 2, and line 56, page 3, the word "felly" should read *fellow;* and in line 112, page 3, after the word "imparting" the word *to* should be inserted; and that the said Letters Patent should be read with these corrections therein that the same may conform to the record of the case in the Patent Office.

Signed and sealed this 13th day of July, A. D., 1909.

[SEAL.]

C. C. BILLINGS,
*Acting Commissioner of Patents.*

It is hereby certified that in Letters Patent No. 924,242, granted June 8, 1909, upon the application of William H. Kenerson, of Providence, Rhode Island, for an improvement in "Torsion-Measuring Apparatus," errors appear in the printed specification requiring correction, as follows: In line 26, page 1, the word "of" should read *or;* line 126, page 2, and line 56, page 3, the word "felly" should read *fellow;* and in line 112, page 3, after the word "imparting" the word *to* should be inserted; and that the said Letters Patent should be read with these corrections therein that the same may conform to the record of the case in the Patent Office.

Signed and sealed this 13th day of July, A. D., 1909.

[SEAL.]

C. C. BILLINGS,
*Acting Commissioner of Patents.*